United States Patent [19]

Papuchon

[11] Patent Number: 5,052,770

[45] Date of Patent: Oct. 1, 1991

[54] OPTICAL DEVICE FOR THE PROCESSING OF AN OPTICAL WAVE, ITS FABRICATION METHOD AND A FREQUENCY DOUBLER

[75] Inventor: Michel Papuchon, Massy, France

[73] Assignee: Thomson-CSF, Puteax, France

[21] Appl. No.: 468,261

[22] Filed: Jan. 22, 1990

[30] Foreign Application Priority Data

Feb. 9, 1989 [FR] France ............................... 89 01680

[51] Int. Cl.[5] ............................................. G02B 6/10
[52] U.S. Cl. .................................. 359/328; 359/332; 385/122; 385/141
[58] Field of Search ................. 350/96.11, 96.12, 96.13, 350/96.14, 96.34; 307/424, 425, 427, 430

[56] References Cited

U.S. PATENT DOCUMENTS

| | | | |
|---|---|---|---|
| 3,842,289 | 10/1974 | Yariv et al. ........................... | 307/430 |
| 4,236,785 | 12/1980 | Papuchon et al. ................. | 350/96.14 |
| 4,382,660 | 5/1983 | Pratt, Jr. et al. ................... | 350/96.14 |
| 4,865,406 | 9/1989 | Khanarian et al. ................ | 350/96.12 |

FOREIGN PATENT DOCUMENTS 2385114 10/1978 France .

OTHER PUBLICATIONS

"Electronics Letters", vol. 25, No. 3, Feb. 2, 1989, pp. 174–175, E. J. Lim et al.: Second-Harmonic Generation of Green Light in Periodically Poled Planar Lithium Niobate Waveguide *Chapters: Poling Process & Device Technology*.
"IEEE Photonics Technology Letters", vol. 1, No. 10, Oct. 1989, pp. 316–318, IEEE, New York, US; J. Webjorn et al.: Blue Light Generated by Frequency Doubling of Laser Diode Light in a Lithium Niobate Channel Waveguide *Page 316, Lines 13–29, References 3–6*.
"Appl. Phys. Lett.", vol. 47, No. 11, Dec. 1, 1985, pp. 1125–1127, American Institute of Physics; A. Feisst et al.: Current Induced Periodic Ferroelectric Domain Structures in LiNbO3 Applied for Efficient Nonlinear Optical Frequency Mixing.
Applied Physics Letter, vol. 47; No. 11, Dec. 1, 1985; pp. 1125–1127, American Institute of Physics, Woodbury, N.Y. U.S.;
A. Feisst et al.: "Current Induced Periodic Ferrolectric Domain Structures in LiNbO3 Applied for Efficient Nonlinear Optical Frequency Mixing".
Applied Optics, vol. 26, No. 21; Nov. 1, 1987, pp. 4576–4580; New York, U.S.; H. A. Haus et al.: "Enhancement of Surface Second Harmonic Generation with Waveguides".
Journal of Applied Physics, vol. 50; No. 7, Jul. 1979; pp. 4599–4603, American Institute of Physics; S. Miyazawa: "Ferroelectric domain inversion in Ti-diffused LiNbO3 Optical Waveguide".

Primary Examiner—Frank Gonzalez
Attorney, Agent, or Firm—Oblon, Spivak, McClelland, Maier & Neustadt

[57] ABSTRACT

Disclosed is an optical device for the processing of an optical wave by non-linear effects, comprising, on the surface, a guide and doping zones arranged transversally to the direction of the guide. The distribution pitch of these zones is equal to an even multiple of the length of coherence for the interaction envisaged. The length of each zone along the direction of the guide is equal to an odd multiple of the length of coherence.

2 Claims, 1 Drawing Sheet

FIG_1
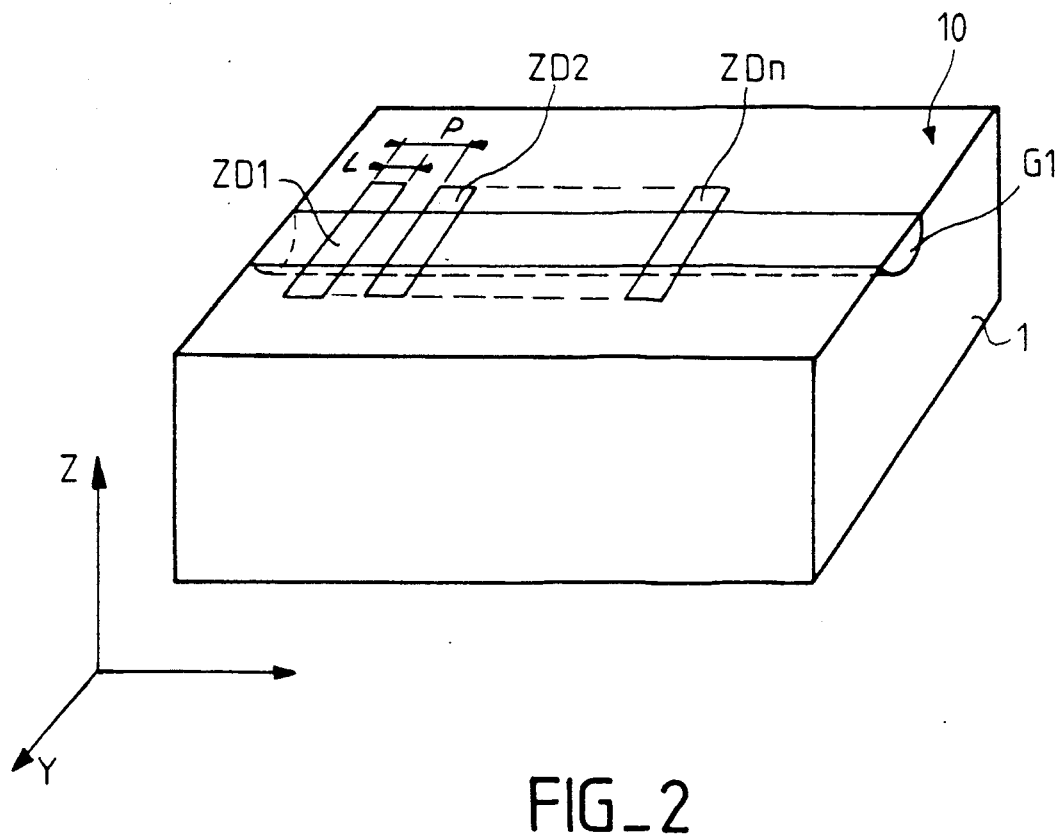
FIG_2
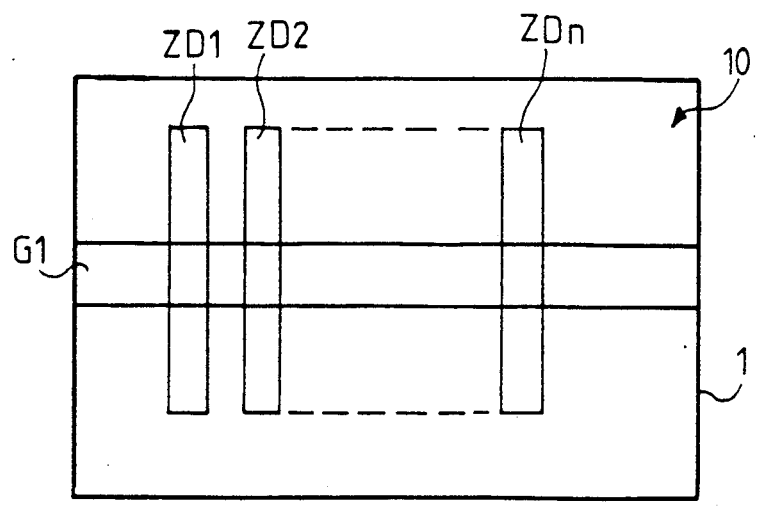

OPTICAL DEVICE FOR THE PROCESSING OF AN OPTICAL WAVE, ITS FABRICATION METHOD AND A FREQUENCY DOUBLER

BACKGROUND OF THE INVENTION

1. Field of the Invention

The invention concerns an optical device for the processing of an optical wave, its method of fabrication and a frequency doubler.

More particularly, it concerns a device and a method enabling major optical non-linear effects to be obtained in waveguides made of ferroelectric materials.

2. Description of the

It is well known that the electrical polarization induced in a medium by an electromagnetic wave can be written out as follows:

$$P = d^{(1)}E + d^{(2)}EE + \ldots$$

where E is the electric magnetic field associated with the electromagnetic wave.

In this expression, the first term is responsible for the linear properties of the material and the following terms are responsible for the non-linear properties which can give rise to phenomena of frequency doubling, tripling, addition etc.

The even-order terms exist only in media having no center of symmetry.

For such non-linear interactions to be effective, it is generally necessary to ascertain that there is a condition called a phase-matching condition. For, at every point, the non-linear polarization will radiate an electromagnetic field having the same frequency but with a phase that will be determined by the sum of the phases of the generating fields at this point. On the other hand, the phase of the radiated field will naturally behave differently and, in particular, will depend on the refractive index of the medium at the harmonic frequency.

In fact, another way to formulate this condition is to assume that two conditions have to be considered for such non-linear interactions to be effective:

1) Conservation of energy
2) Conservation of the moments (wave vectors in this case)

For simplicity's sake, let us consider the case of the generation of a second harmonic. In this case, we have:

$$P(2w) \text{ proportionate to } d^{(2)}E(w)E(w)$$

and hence:

k (2w) = 2 k(w)
2 (2πn(w)) // F = n(2w) 2π/λ(2w)
λ(w) being the wavelength of the fundamental
λ(2w) being the harmonic wavelength.

It is this latter condition that is called "phase matching".

This condition may be achieved, in practice, by using for example the birefringency of the material. In this case, the harmonic wave (2w) and the fundamental wave (w) can be polarized according to the different inherent directions of the crystal being used. For example, if the harmonic wave is extraordinarily polarized and if the two fundamental waves coming into the interaction are ordinarily polarised, the following has to be ascertained:

$$2(2\pi n_o(w))/\lambda(w) = n_e(2w)2\pi/\lambda(2w)$$

where $n_o$ (w) is the index of the medium for the wavelength of the fundamental $n_e$ (2w) is the index of the medium for the harmonic giving $n_e$ (2w) = $n_o$ (w)

This condition can be achieved in certain materials either by using temperature effects or by changing the angle of propagation with respect to the optical axis $n_e = f$ (angle). The angle considered is the angle between the direction of propagation and the optical axis of the material considered.

Other techniques may be used to set up the phase matching, such as those described in the following documents:

Article by N. BLOEMBERGEN et al in Applied Physics Lettters, 17, 483, 1970;
Article by B. JASKORZYNSKA et al in SPIE volume 651, Innsbruck, 1986;
Article by T. TANIUCHI et al in SPIE, volume 864, Cannes, 1987.

For example, the presence of a diffraction grating within the material can lead to a cancellation of the mismatching between K (2w) and 2K (w) if the period of the grating is accurately chosen.

We should have:

K(2w) - 2 k(w) = mK (grating) where m is an integer and K is the wave vector associated with the grating (k − 2π/period).

In such an interaction, the grating may be created on the basis of either the linear properties of the material or its non-linear properties. In the latter case, it is advantageous (more efficient) to create a change in the sign of the non-linear coefficient concerned.

This technique is particularly valuable with materials having non-linear coefficients that cannot be used with standard phase matching methods. This, for example, is the case with the non-linear coefficients X33 of $LiNbO_3$ and $LiTaO_3$ which bring into play fundamental and harmonic waves polarized along the optical axis of these materials (extraordinary polarization).

If we consider the case of $LiNbO_3$ with X33, demonstrations have been given by periodically reversing the ferroelectric polarization (and hence the sign of X33) during the growth of the crystal (as described in the article by D. FENG in Applied Physics Letter, 37, 607, 1980).

The goal of the invention is to propose means that enable periodical reversals of the non-linear coefficient of an optical guide.

SUMMARY OF THE INVENTION

The invention concerns an optical device for the processing, by non-linear effects, of an optical wave with a determined wavelength (w) and length of coherence (Lc = π/k(zw) − 2k(w)) for the non-linear interaction used, said device comprising, within a ferroelectric substrate transparent to the wavelength (w) of the optical wave:

a two-dimensional optical guide, implanted in the surface of the substrate and oriented along a first direction;

doping zones distributed along the optical guide, each doping zone having a length, along the first direction, which is an odd multiple of the length of coherence (Lc), and the distribution pitch of doping zones having a value that is an even multiple of the length of coherence, the doping zones giving rise to a reversal of the polarization of the optical wave with respect to the the polarization in the zones included between the doping zones.

The invention also concerns a method for the fabrication of an optical device, said method comprising the following steps:

a) the making, on one face of a transparent ferroelectric substrate, of doping zones distributed along a first direction with a pitch equal to an even multiple of the length of coherence (Lc), each zone having a length equal to an odd multiple of the length of coherence (Lc), the doping being such that it reverses the polarization of the wave with respect to that in the non-doped zones;

b) the making of an optical guide in the first direction.

Finally, the invention concerns a frequency doubler comprising a two-dimensional optical guide provided with doping zones distributed along the length of the optical guide, with a periodicity equal to the length of coherence of an optical wave to be processed, the length of each zone being equal to a half length of coherence.

BRIEF DESCRIPTION OF THE DRAWINGS

The various objects and features of the invention will be understood more clearly from the following description, given as an example, in referring to the appended drawing wherein:

FIGS. 1 and 2 show an exemplary embodiment of the device according to the invention.

DETAILED DESCRIPTION OF THE INVENTION

The aim of the invention is to propose a method enabling the periodic reversal of the non-linear coefficient a posteriori (namely after the growth of a monodomain crystal) on the surface so that it is possible to make an optical waveguide in the material thus prepared. In this context, the fabrication of a waveguide for the fundamental and harmonic waves is very useful because it is thus possible to set up, in the interaction zone, very high optical intensities with low incident power values, and this leads to high efficiency (since the harmonic intensity generated is proportionate to the square of the fundamental intensity).

Although the principles described herein are applicable to other crystals, for simplicity's sake, in the description of the invention, we shall concentrate on the example of $LiNbO_3$.

It has been pointed out by S. MIYAZAMA, in the *Journal of Applied Physics*, 50, 4599, 1979, that the presence of a surface concentration of dopants can, under certain conditions (such as a concentration of dopant on the +C face of the crystal), cause the formation of a zone, the ferroelectric orientation of which is reversed with respect to the original substrate. In general, the zone of reversed ferroelectric polarization is therefore superficial and is therefore advantageously used in the case of guided optical waves.

The invention profits by this effect and, through a surface doping of the ferroelectric material in periodic form, it provides for the creation, on the surface of the substrate, of a periodic reversal of the ferrolectric polarization of the crystal and, therefore, of the non-linear coefficient. Thus, after the fabrication of a waveguide, a frequency doubler in integrated optics will have been made, capable of using the greatest electro-optical coefficient of the material considered (in this case X33 of $LiNbO_3$).

FIGS. 1 and 2 represent an exemplary embodiment of the device according to the invention.

In FIG. 1, a substrate 1 oriented in a trihedron with a reference XYZ has, on its surface 10, an optical guide G1 oriented along an axis X. Doping zones ZD1, ZD2, ... ZDn are distributed lengthwise along the guide. The distribution pitch p of the zones, according to the example of FIG. 1, is equal to twice the length of coherence Lc for the generation of the second harmonic of an incident light wave FI. The length L of a doping zone along the direction Z is equal to one length of coherence of the light wave.

In FIG. 2, showing the device in a top view, zones ZD1, ZD2, ... ZDn are made in the form of strips perpendicular to the direction X of the guide G1.

In FIGS. 1 and 2, the length L has been chosen as being equal to half the pitch p. However, there could be different proportions, for example $p = 2K L_c$ and $L = kL$ with $k = 3$, which would make $p = 6 L_c$ and $L = 3 L_c$. The value of the pitch p could also be different in various zones of the guide.

An arrangement such as this enables the making of a frequency doubler, the incident wave FI with a frequency w then giving a wave FS with double frequency 2w.

We shall now describe a method of fabrication according to the invention, enabling such a device to be made.

An an exemplary method of fabrication, the following process can be described:

1) A grating of titanium strips is deposited on the +C face of an $LiNbO_3$ substrate. The pitch of the grating is chosen so as to compensate for the phase mismatching between the fundamental waves and the harmonic waves that it is sought to generate.

2) The titanium strips are diffused into the substrate by a high temperature process (for example, 1000° C. for a few hours in an oxygen atmosphere).

3) A waveguide is built by a method that does not modify the orientation of the ferroelectric domains (for example, proton exchange which occurs at low temperatures, as described in J. L. JACKEL et al in Applied Physics Letters, 41, 607, 1982.

In this method, the pitch p of the grating is chosen so as to verify the relationship:

$$2\pi(n_{ef}(2w) - n_{ef}(w))/\lambda(2w) = 2\pi m/p$$

where $N_{ef}(2w)$ is the effective index of the mode of the guide for the harmonic 2w of the incident wave;

$n_{ef}(w)$ is the effective index of the guided mode for the fundamental w of the incident wave.

$\lambda(2w)$ is the length of the harmonic wave corresponding to the optical frequency 2w.

m is an integer.

In the case of $LiNbO_3$, taking the values of the refraction indices cited in current literature, the following minimum grating pitch is obtained (taking $n_{ef} = n$):

| | |
|---|---|
| fundamental wavelength | 9 micrometers |
| index at w | 2.1741 |
| index at 2w | 2.2765 |
| pitch | 4.39 micrometers |
| fundamental wavelength | 1 micrometer |
| index at w | 2.1647 |

| -continued | |
|---|---|
| index at 2w | 2.2446 |
| pitch | 6.255 micrometers |

The main points of the system described are therefore:
- periodic reversal of the ferroelectric polarization by diffusion of a dopant on the +C face of the crystal;
- creation of a waveguide by a method that does not modify the polarizations created (for example, by proton exchange).

The advantages are:
- Non-linear generation through "artificial" phase-matching by using a high non-linear coefficient (X33 in the case of LiNBO₃ and LiTaO₃ or ferroelectric);
- Guided interaction for the harmonic and fundamental waves (unlike the case of Cerenkov type configurations) causing a harmonic intensity proportionate to the square of the interaction length (proportionate only to the length in the case of Cerenkov type configurations);
- Monomode and Gaussian type shape of the harmonic beam, easily transformable by a standard optic device.

It is clear that the above description has been given purely by way of a non-restrictive example. The numerical examples have been given solely to illustrate this description.

Other variants may be considered without going beyond the scope of the invention. In particular, the substrate used may be a ferroelectric other than LiNbO₃ or LiTaO₃. In this case, the implanting of the guide and of the doping zones will not necessarily be made from the +C face of the substrate, the essential point being that of obtaining periodic reversals of polarization in the doped zones with respect to the polarization in the non-doped zones.

What is claimed is:

1. A method for fabrication of an optical device for frequency doubling of a guided optical wave, said wave having a determined wavelength, comprising the steps of:
   providing a polarized ferroelectric $LiTaO_3$ substrate, wherein said substrate and said wavelength define a length of coherence;
   forming a two dimensional optical guide along a first direction in the +C surface of said substrate by low temperature ion exchange, wherein said guide consists essentially of $(Li_xH_{1-x})TaO_3$ with $0<X<1$;
   making doping zones along said first direction by titanium implantation in said +C surface, said zones being made in the form of strips oriented in a second direction which is perpendicular to said first direction, each zone having a length along said first direction of one half of said length of coherence and a period of said length of coherence, said zones having a polarization opposite the polarization of said substrate.

2. An optical device for frequency doubling of a guided optical wave, said wave having a determined wavelength comprising:
   a polarized ferroelectric $LiTaO_3$ substrate that is transparent to said wave, wherein said substrate and said wavelength define a length of coherence;
   a two dimensional optical guide in the +C surface of said substrate, said guide oriented along a first direction, wherein said guide consists essentially of $(Li_x H_{1-x})TaO_3$ with $0<X<1$;
   doping zones formed by titanium implantation on the +C face of said substrate, said zones in the form of strips oriented in a second direction that is perpendicular to said first direction, said zones distributed along said first direction of said guide with a period equal to the length of coherence, each zone having a length along said first direction of one half of said length of coherence, said zones having a polarization opposite the polarization of said substrate.

* * * * *